US008271374B2

(12) United States Patent
Montepeque

(10) Patent No.: US 8,271,374 B2
(45) Date of Patent: Sep. 18, 2012

(54) METHOD FOR ASSESSING A COMMODITY PRICE AND ASSESSMENT DETERMINED THEREBY

(75) Inventor: Jorge Eduardo Montepeque, New Malden (GB)

(73) Assignee: The McGraw-Hill Companies, New York, NY (US)

( * ) Notice: Subject to any disclaimer, the term of this patent is extended or adjusted under 35 U.S.C. 154(b) by 1278 days.

(21) Appl. No.: 10/206,831

(22) Filed: Jul. 29, 2002

(65) Prior Publication Data

US 2004/0078315 A1     Apr. 22, 2004

(51) Int. Cl.
*G06Q 40/00* (2012.01)
(52) U.S. Cl. ................. 705/37; 705/10; 705/20
(58) Field of Classification Search .............. 705/37, 705/36, 35, 26, 20, 10, 1
See application file for complete search history.

(56) References Cited

U.S. PATENT DOCUMENTS

| | | | |
|---|---|---|---|
| 5,414,838 | A | 5/1995 | Kolton et al. |
| 6,456,982 | B1 | 9/2002 | Pilipovic |
| 2001/0021924 | A1 | 9/2001 | Ohno |
| 2001/0032161 | A1 | 10/2001 | Thomas et al. |
| 2001/0034688 | A1 | 10/2001 | Annunziata |
| 2002/0013758 | A1 | 1/2002 | Khaitan |
| 2002/0023044 | A1 | 2/2002 | Cichanowicz |
| 2002/0042765 | A1 | 4/2002 | Dawson |
| 2002/0049667 | A1 | 4/2002 | Navani et al. |
| 2002/0052793 | A1 | 5/2002 | Dines et al. |
| 2002/0052817 | A1 | 5/2002 | Dines et al. |
| 2002/0069153 | A1 | 6/2002 | Lin |
| 2002/0073009 | A1 | 6/2002 | Hogg et al. |
| 2002/0120555 | A1 | 8/2002 | Lerner |
| 2002/0128938 | A1 | 9/2002 | Ronald Schofield et al. |
| 2002/0133451 | A1 | 9/2002 | Wang et al. |
| 2002/0138392 | A1 | 9/2002 | LeBlanc |
| 2002/0161695 | A1 | 10/2002 | Nishimura |
| 2002/0165809 | A1 | 11/2002 | Gendelman |
| 2002/0174053 | A1 | 11/2002 | Tan |
| 2002/0178104 | A1 | 11/2002 | Hausman |

OTHER PUBLICATIONS

John Downes & Jordan Elliot Goodman, Dictionary of Finance and Investment Terms, 1998, Barron's Financial Guides, Fifth Ed., pp. 116, 594-599, 703.*
Altra Market Place, "eLiquids", pp. 1-4, http://www.altranet.com/browse.php/ngl_crude/, copyright 1999-2001.
AVATAR400 Crude Oil Marketing, "Crude Oil Marketing", p. 1, http://www.avatarsystems.net/pangds/av400/av400_com.htm.
Crudemanager, "Features Overview", pp. 1-2, http://www.crudemanager.com/featuresoverview.asp, copyright 2002 (date of first publication unknown).
Global View Software Inc., "GlobalView Press Release", pp. 1-3, http://www.gvsi.com/press_releases/pr-GVSI-Nymex.htm, Mar. 14, 2001.
Global View Software Inc., "Network LAN/WAN Solutions", pp. 1-2, http://www.gvsi.com, (date of publication unknown).
Global View Software Inc., "EnergyView™", http://www.energyyiew.com, pp. 1-2 copyright 1999.
Gosmano, Jeff "Software Aims to Improve Refining, Trading Decisions", e-Business, www.energy/intel.com, energy network Nov. 20, 2001.
International Energy Agency, "The IEA Monthly Oil Data Service", pp. 1-3, http://www.iea.org/stats/files/mods.htm, (date of first publication unknown).
Kase and Company, Inc., "Kase Hedging Services", pp. 1-3, http://www.kaseco.com/products_services/hedgemodel/hedgemodel_more.htm.
Kase and Company, Inc., "The Kase HedgeModel", pp. 1-4, http://www.kaseco.com/products_services/hedgemodel/about_hedgemodel.htm.
OPISNET.COM, "About Us", pp. 1-16, http://www.opisnet.com/aboutus.asp, (date of first publication unknown).
Petro Vantage, "TradersEdge™ for Crude"; pp. 1-2; http://www.petrovantage.com/pages/traders_edgecrud.html.
Petro Vantage, "Crude Oil Refinery Margin Evaluation (COE-R)"; pp. 1-2; http://www.petrovantage.com/pages/Traders_COER.html.
Petro Vantage, Crude Oil Blending & Trading (COBAT); p. 1; http://www.petrovantage.com/pages/Traders_COBAT.html.
SSHL, Data, Government and Geographic Information Services, "Oil Market Simulation Model", pp. 1-3, http://ssdc.ucsd.edu/dmp/B3260869x/, 1993.

* cited by examiner

*Primary Examiner* — Siegfried E Chencinski
(74) *Attorney, Agent, or Firm* — Rothwell, Figg, Ernst & Manbeck PC

(57) ABSTRACT

A method of assessing a market price of a benchmark grade of a commodity includes artificially injecting additional volumes of the benchmark grade into the marketplace to thereby increase the market activity upon which the assessment is based. By increasing the market activity upon which the benchmark assessment is based, problems associated with having a small number of market events for assessing the benchmark price, such as price volatility, may be avoided. Additional volumes of the benchmark grade may be artificially injected into the marketplace by including, in the assessment of the benchmark price, observations of market events involving one or more alternative, non-benchmark grades of the commodity. Alternatively, or in addition, additional volumes of the benchmark grade may be artificially injected into the marketplace by permitting a seller offering cargoes of the benchmark grade of the commodity to actually deliver a cargo of one or more alternative, non-benchmark grades of the commodity in satisfaction of a contract for sale of the benchmark grade.

20 Claims, No Drawings

METHOD FOR ASSESSING A COMMODITY PRICE AND ASSESSMENT DETERMINED THEREBY

BACKGROUND OF THE INVENTION

1. Field of the Invention

The present invention relates to a method for assessing a price for a commodity benchmark that minimizes volatility and non-normal swings in the benchmark price.

2. Description of the Background Art

Commodities, e.g., crude oil and agricultural products, are traded on a daily basis. The actual prices for which commodities are bought and sold have typically been extremely volatile, being affected by a variety of factors many of which are often difficult, if not impossible, to predict and beyond the control of traders. Because of this volatility, it is nearly impossible to predict what the market price for a specific commodity will be on some date in the future. In addition, because commodity trading is often conducted on very slim margins, an even slight miscalculation of a market price can spell financial disaster. Accordingly, most commodities are rarely traded on a fixed price basis. Most commodities are traded on what is known as a floating price basis. The price of a trade, or offer for trade, is not expressed in a fixed denomination, but is expressed as a benchmark, or baseline price, usually a market indicator or the spot price of a specified grade of the commodity, plus or minus a differential. That is, the price of a sale today of a commodity for delivery on a future date certain may be expressed as the benchmark price of the commodity that will be established on the date certain adjusted, up or down, by some agreed-upon differential.

Crude oil is one of the most heavily traded commodities. Oil prices are a result of thousands of transactions taking place around the world, at all levels of the distribution chain from crude oil producer to individual consumer. Oil markets are essentially a global auction—the highest bidder will win the supply. Like any auction, however, the bidder doesn't want to pay too much. Likewise, the seller does not want to sell too low.

There are several different types of transactions that are common in oil markets. Contract arrangements in the oil market in fact cover most of the oil that changes hands. Oil is also sold in "spot transactions," that is cargo-by-cargo, transaction-by-transaction arrangements. A spot transaction is an agreement to buy or sell one cargo of oil under a price agreed-upon at the time of the arrangement. In addition, oil is traded in futures markets through exchanges, such as the New York Mercantile Exchange (NYMEX) and the International Petroleum Exchange (IPE). A futures contract is a promise to deliver a given quantity of a standardized commodity at a specified place, price, and time in the future. Futures markets are a mechanism designed to distribute risk among participants on different sides (such as buyers versus sellers) or with different expectations of the market, but not generally to supply physical volumes of oil. The exchange records the pairings of buyers and sellers, and reports the transaction prices. Various reporting services report the transactions with minimal lag. Both spot markets and futures markets provide critical price information for contract markets. Spot prices provide information about current supply and demand, rising when supply is low relative to demand and falling when supply is high relative to demand. Futures contracts provide information about market prices for future delivery.

As with many other commodities, forward contracts in crude oil traded on international markets is traded on the basis of floating prices: a base price plus or minus a differential. A common pricing term sets a base price of a spot price published by a particular source or publication. For crude oil sold into the United States Gulf Coast, for example, the base would commonly be the price of West Texas Intermediate (WIT) crude oil. Crude oil sold into much of Europe and across the Atlantic is often tied to the spot price for the North Sea's Brent Blend, and crude oil sold into Singapore or other South East Asian locations is often tied to Dubai crude. The Brent blend is technically a mix of crude from the Shell UK-operated Brent field and the British Petroleum-operated Ninian field. The blend is, however, commonly referred to simply as Brent. The differential is often tied to a quality difference in the actual blend being traded as compared to the benchmark blend. For example, a transaction involving Oseberg crude oil, another North Sea blend, may include a price expressed as follows:

900,000 bbl cargo of Oseberg loading July 31-1 August traded at Dated Brent plus 5 cts.

In the above example a seller agreed to sell to the buyer 900,000 barrels of Oseberg blend to be delivered between July $31^{st}$ and August $1^{st}$ for a price of the Dated, or spot, Brent price that will be set on the date of delivery plus a five cents per barrel premium.

The price that will be set on, or around, the date of delivery will be an assessment of the benchmark price. An assessment is a determination of the repeatable, tradable price range for a commodity during the assessed period. The goal of an assessment is to focus in on typical transactable levels, typically by discarding unrepresentative market information (out-of-market bids, offers and transactions). The assessment process differs in this respect from indexation, which is an inclusive process, averaging all available market information. Assessments are typically published as a low-high range for each commodity instrument. Accordingly, the price ultimately paid for the cargo will depend on the spot price assessed on the date of delivery and the differential. Therefore, crude oil trader can maximize the price paid in a transaction by either maximizing the benchmark price or maximizing a premium (i.e., positive) differential (or minimizing a discount (i.e., negative) differential).

Floating pricing based on a specified benchmark price tied to a specified grade of the commodity provides an acceptable pricing scheme as long as the spot price of the benchmark grade is reflective of normal market conditions. If, on the other hand, the price of the benchmark grade becomes exceedingly, and unnaturally, volatile or if the benchmark price increases or decreases by large amounts due to non-normal market forces, the prices of all other grades of the commodity that are tied to the benchmark will exhibit similar aberrant tendencies. Such unnatural market forces may occur when there is a squeeze in the market, that is, when the supply of the benchmark grade is artificially restricted, thereby artificially driving up the benchmark price. Unnatural market forces can also occur if an atypically large volume of the benchmark grade is suddenly dumped onto the market, thereby artificially creating a glut of the benchmark grade and driving down the benchmark price.

A benchmark price becomes susceptible to such non-natural market conditions, and more particularly to market squeezes, when there are low volumes of the benchmark grade that are available for trading. When there are low volumes of the benchmark grade available, a relatively few market players can corner the market by buying up all available tradable supply of the benchmark grade and then restricting the supply to drive up the benchmark price. This is what has occurred in the crude oil markets tied to the Brent blend and the Dubai blend. Because the output productions of Brent and Dubai blends have declined in recent years, there are relatively few Brent or Dubai cargoes available for trade in any given month. For example, due to increasing problems caused by aging fields, production of Dubai in 2002 dropped down to close to 10 monthly cargoes of 500,000 barrels each from close to 30 cargoes a decade earlier. The number of cargoes of each blend has dropped so low that a single participant in the international crude oil market could easily buy all of the available cargoes of either blend to corner the entire market tied to that blend. With the benchmark grade squeezed, the benchmark price, or assessment, can increase dramatically along with all other crude oil grades whose price is tied to the benchmark.

There are a number of possible solutions to squeezes in a benchmark grade of a commodity.

An alternative grade could be selected. That is, the current benchmark grade could be replaced by a different grade for which there is sufficient available, transactable volume so that squeeze and other market aberrations associated with, or caused by, low volumes of the benchmark grade are avoided.

Replacing a benchmark grade can, however, be extremely disruptive to the market. Numerous transactions involving large sums of money would have already been concluded based on the old benchmark. Moreover, many of the transactions will not have been consummated until well into the future with an ultimate price that will be tied to the old benchmark. Furthermore, it is not uncommon for other tradable financial instruments having values tried to the benchmark (known as derivatives) to be developed over the course of time. Such derivatives, for which there is an active trading market, may cease to exit or would have to be converted over to the new benchmark grade if the old benchmark grade were replaced.

Another possible solution would be simply to ignore market squeezes when developing benchmark assessments. This solution may not be satisfactory if the squeeze is prevalent in the market thereby leaving few, if any, arms-length transactions for assessing the benchmark.

It has been known to average the price of two or more grades of a commodity. For example an average price of three North Sea crude oil blends: Brent, Ekofisk, and Forties is traded as a derivative known as the North Sea Basket. The North Sea Basket has not, however, been employed as a benchmark. Moreover, an average, since it will include all transactions involving the averaged grades of the commodity, will still reflect, albeit in a moderated manner, any aberrant, non-fundamental market behavior of any of the constituent grades of the average.

Therefore, there exists a need to devise a means by which leverage in benchmark commodity grades can be diluted and to reconnect the value of the benchmarks to normal market fundamentals.

SUMMARY OF THE INVENTION

The present invention provides a mechanism by which the number of observable events relating to a benchmark grade of a commodity is increased so that the market behavior of the benchmark grade becomes more orderly and less volatile. To use an analogy from physics: the objective is to increase the mass of the object so its trajectory becomes more stable and less liable to be thrown off course by a small disturbance.

While materials can be blended, melted, or fused to physically increase their mass, these options are not, however, available in many commodity markets, including the crude oil marketplace. Dubai, and other similar crude oil grades, cannot be physically blended because of distance and other logistical constraints. Hence an effective, editorial, blending of the commodities was developed to simulate, for market purposes, the physical blending of two or more different grades.

Thus, in accordance with one aspect of the invention, a method of determining a benchmark price for a commodity is provided, wherein the benchmark price corresponds to a benchmark grade of the commodity. An effective tradable volume of the benchmark grade is created. The effective volume is greater than an actual, physical volume of the benchmark grade. Thus, a number of effective market events involving the effective tradable volume of the benchmark grade is greater than a number of actual market events involving actual, physical volumes of the benchmark grade. The benchmark price is then assessed based on the effective market events involving the effective tradable volume of the benchmark grade.

In accordance with another aspect of the invention, a method of determining a benchmark price for a commodity is provided, wherein the benchmark price corresponds to a benchmark grade of the commodity. The benchmark price is assessed based on market events involving at least one of one or more grades of the commodity, including the benchmark grade. The number of market events upon which the assessed benchmark price is based is increased by including in the market events upon which the assessed benchmark price is based transactions involving the benchmark grade of the commodity as well as transactions involving at least one alternative grade of the commodity. The transactions may be contracts for sale of and/or actual deliveries of quantities of the benchmark or alternative(s) grades of the commodity.

With these and other objects, advantages, and features of the invention that will become hereinafter apparent, the nature of the invention may be more clearly understood by reference to the following detailed description of the invention and the appended claims.

DETAILED DESCRIPTION OF THE PREFERRED EMBODIMENTS

In accordance with the present invention, the effective volume of a benchmark grade of a commodity is increased, relative to actual, physical volumes of the benchmark grade, for the purposes of assessing the benchmark price. In the context of the present disclosure, the effective volume of the benchmark grade refers to a volume of the commodity that is evaluated for the purposes of assessing the benchmark price. Economic activity involving the effective volume which is evaluated for defining the assessment may include offers, trades, and/or deliveries involving actual, physical volumes of the benchmark grade as well as offers, trades, and/or deliveries involving volumes of one or more alternate grades of the commodity. Also, in the context of the present invention, a grade of a commodity refers to a discrete subset of the entire amount of the commodity that is traded in the applicable market and is uniquely priced (but not necessarily differently priced relative to other grades of the commodity) based at least in part on particular attributes, e.g., quality, that are unique to the grade. For example, in the context of crude oil markets, different grades are defined by the location from which the oil was pumped, as crude oil pumped from different locations will typically exhibit unique and different qualitative properties and chemical compositions.

In certain circumstances, different grades may include grades of entirely different commodities that are sufficiently related, or have sufficiently similar market characteristics, such that market behavior involving one of the commodities can be considered reflective of market behavior involving the other commodity.

By establishing an effective volume of the benchmark grade of the commodity that is greater than the actual volume of the benchmark grade, a larger number of transactions involving the effective volume are available for consideration and analysis for assessing the benchmark price then would be available if only transactions involving actual, physical volumes of the benchmark grade were considered.

Although not intended to be limiting of the scope of the invention claimed, in the preferred embodiment of the present invention, there are two alternate methods for creating an effective volume of the benchmark grade that is greater than the actual volume. The two methods for creating a larger effective volume are: (1) factoring in transactions in one or more alternate grades of the commodity when assessing the price of the benchmark grade; and (2) permitting sellers of the benchmark grade to provide deliveries of one or more alternate grades of the commodity in satisfaction of a contract for sale of the benchmark grade. Although the methods are described as alternate methods, they could be employed in combination to create a larger effective volume.

As will be described in greater detail below, a larger effective volume of the benchmark price can be created by considering, when assessing the benchmark price, not only transactions involving the benchmark grade but also transactions involving one or more alternate grades of the commodity. Accordingly, the effective volume of the benchmark grade for assessing the benchmark price becomes the actual, physical volume of the benchmark grade for which there are transactions during the assessment period plus the volume(s) of the one or more alternate grades for which there are transactions during the assessment period.

The market for the benchmark grade cannot, therefore, be squeezed, because even if a particular trader were to corner the market for the benchmark grade in an attempt to drive up the benchmark assessment, transactions involving the alternate grades, which are not subject to the squeeze, are still available for consideration in assessing the benchmark price. If the market behavior of the benchmark grade appears to be so aberrant as to be deemed not reflective of market conditions, the prices can be adjusted so as to be more consistent with market norms, or the aberrant transactions can be ignored altogether and the benchmark price can be assessed from transactions involving the alternate grades. The one or more alternate grades selected preferably are available in sufficient volumes so that buying all the available volumes of both the benchmark grade and the alternate grade(s) would not be feasible.

The effective volume can also be increased by permitting sellers of the benchmark grade, at their discretion, to deliver a specified alternate grade of the commodity in satisfaction of a contract for sale involving the benchmark grade. By way of illustration, if the benchmark grade of a particular commodity is "Grade A," a larger effective volume of Grade A is created if a seller of Grade A may, at the seller's discretion, deliver a Grade B of the commodity in satisfaction of a contract for the sale of Grade A.

The effective volume of the benchmark grade for purposes of assessing the benchmark price is then the actual volume of the benchmark grade for which there are transactions during the assessment period plus the volume of the alternate grade that was delivered in satisfaction of contracts for sale of the benchmark grade during the assessment period. The potential effective volume of the benchmark grade is then the actual volume of the benchmark grade for which there are transactions during the assessment period plus the volume of the alternate grade of the commodity that is available for delivery during the assessment period.

The benchmark grade cannot, therefore, be squeezed because regardless how much of the benchmark grade a trader buys, the trader cannot, at least in a commercially feasible manner, buy up all of the effective volume of the benchmark grade. To buy all the effective volume to truly squeeze the benchmark assessment, the trader would have to buy not only all the available physical volume of the benchmark grade, but also all the available physical volume of the alternate grade(s).

In devising the method of assessing the benchmark price, it is important that the method devised does not put too much market power in the hands of too few players. Such power imbalances can occur when too few market players have control over the grade(s) of a commodity used to define the benchmark assessment. Thus, when specifying an alternate grade of the commodity for use in creating the larger effective volume of the benchmark grade, it may be necessary to specify more than one alternate grade if different grades of the commodity are controlled by single market players, for example, the producer of all of a specific alternate grade.

The present invention, and, in particular the preferred embodiment of the present invention, will be further illustrated by means of specific examples involving the assessment of international crude oil benchmarks, specifically Brent in the North Sea and Dubai in the Middle East/Asia. It should be understood, however, that the method of the present invention can be employed in assessing a benchmark price of any commodity.

Brent assessments may be expressed as dated Brent, meaning the price of a cargo of Brent blend that has acquired a specific set of loading dates, usually about two weeks from loading, and daily forward cash Brent. Daily forward cash Brent is a contract for sale of a physical cargo of Brent between a buyer and seller wherein the month, but not the specific date, of delivery is specified. To offset steady declines in the number of Brent blend cargoes that are available for loading in a given month, the assessed price of Brent, both dated Brent and daily forward cash Brent, takes into account market activity in two other North Sea crude oil blends: Oseberg and Forties. Although there are numerous other North Sea blends, Oseberg and Forties are fairly close in quality, price, and geographical location to Brent. Thus, the inventor believes that assessment of declining Brent production output will be more reflective of normal market fundamentals for North Sea crude oils if the definition of the Brent assessment is broadened to include Oseberg and Forties, that is, if the effective volume of the Brent blend for the applicable assessment period includes actual, physical volumes of Brent as well as physical volumes of Oseberg and Forties for which there are valid transactions during the assessment period. Both Forties and Oseberg blends are included in the effective volume of Brent because including either Forties or Oseberg alone might have instilled too much market power in the entities that control Oseberg and Forties. Including even more North Sea blends in the effective volume of the Brent assessment would, theoretically, decentralize market power even further. It was concluded, however, that the most preferred implementation of the present invention for the Brent assessment includes only Oseberg and Forties in the effective volume of Brent because including more blends in the Brent effective volume would make the resulting market unnecessarily complex.

The Forties and Oseberg blends are included in the Brent effective volume by analyzing transactions and other market activity (e.g., offers to buy or sell) and selecting as the assessed Brent price the one of the three prices that is most competitive at the margin. Under normal market conditions, Brent has historically been priced lower than either Oseberg or Forties. Thus, under normal market conditions, Brent blend will be the most competitive of the three blends at the margin and will therefore set the assessment for the Brent benchmarks. Because Forties and Oseberg are typically priced higher than Brent, including Forties and Oseberg in the Brent effective volume functions as a cap for the Brent benchmark assessment. Even if the Brent price begins to behave out of line with normal market fundamentals, the Brent benchmark assessment would remain consistent with normal market fundamentals because the assessment will not exceed the most competitive price of Oseberg or Forties.

Selecting, as an alternate grade of a commodity to be included in the effective volume of a benchmark grade of the commodity, a grade that is typically priced higher than the benchmark grade can act as a cap for the benchmark assessment if the benchmark is assessed at the grade that is most competitive at the margin. It may be undesirable to select an alternative grade that is typically priced lower than the benchmark grade if the benchmark is assessed at the grade that is most competitive at the margin because the typically lower-priced alternative will become more influential in setting the benchmark assessment than the actual benchmark grade.

To further illustrate the method of the present invention, the Brent assessment that occurred on Jul. 10, 2002 is described below:

As explained above, the basic principle of the Dated Brent methodology of the present invention is that the most competitive grade of the three under consideration should under normal market conditions determine the ultimate Dated Brent assessment. This mechanism is designed to cap anomalous upward pressure on the Brent market by effectively setting a requirement for market participants wishing to move prices up to buy a substantial percentage of all available Brent, Forties and Oseberg cargoes over an 12-day loading range. Dated Brent assessments are established by the market activity concerning dates 10 to 21 days forward from the assessment date. The 10-21 day forward window is the assessment period.

While the basic principle is simple, the process of determining the most competitive grade involves a number of steps: (1) analyzing the validity of transactions, bids, and offers in terms of their relevance to repeatable transactable value; (2) normalizing prices to align them with the assessed date range; and (3) converting, where necessary, floating prices to the ultimate fixed price assessment.

Market Activity on Jul. 10, 2002

On Jul. 10, 2002 the following market events occurred in the physical market that provided some degree of transparency to the key commodities reflected in the Dated Brent assessment:

1. A physical Brent cargo loading July 21-23 traded at August cash Brent minus 2 cts.
2. A 900,000 bbl cargo of Oseberg cross-month loading July 31-1 August traded at Dated Brent plus 5 cts.
3. A cargo of Forties loading July 24-26 was offered at Dated Brent plus 10 cts.

These market events were analyzed as follows:

1. The Brent cargo transaction fell within normal parameters for size and loading dates, and no further evaluation was required.
2. In the case of the Oseberg cargo, it could be argued that a buyer would be willing to pay a premium for the convenience of the larger size, while a seller would be willing to sell slightly lower on the basis of the optionality afforded in pricing by the end month/early month loading. Because of these opposing arguments, which effectively neutralize each other, it was determined that Dated Brent plus 5 cts was fair value for the cargo.
3. In the case of the Forties offer, analysis of recent market activity indicated that market value was slightly below the offer level. A value was assessed at close to Dated Brent plus 7.5 cts, and the offer of Dated Brent plus 10 cts was treated an effective sale at Dated Brent plus 7.5 cts for the purpose of the assessment.

This analysis resulted in the following normalized basic assessments:

Normalized Basic Assessments (not adjusted for time value)

1. Dated Brent loading July 21-23 at August cash Brent minus 2 cts.
2. Dated Oseberg loading July 31-1 August at Dated Brent plus 5 cts.
3. Forties loading July 24-26 at Dated Brent plus 7.5 cts.

Time Value Analysis

With basic values established, aligned values for Brent, Oseberg and Forties were generated to reflect the overall period of assessment. The preferred methodology of the present invention calls for determining a value for Dated Brent loading 10-21 days forward. The period covered in the assessment published on Jul. 10, 2002, therefore, ranged from Jul. 20-31, 2002.

It was necessary, therefore, to determine whether the cargo values established for the actual loading dates apply to the overall assessment window of Jul. 20 to Jul. 31, 2002. The following factors were considered:

1. Market observations in recent days preceding the July 10 assessment date had indicated relatively strong demand for Brent cargoes loading prompt, but relatively opaque values for cargoes loading further back in the assessed time window. The Brent market was also backwardated during the day of assessment itself, suggesting again that demand for prompt cargoes would exceed demand for forward cargoes. (Backwardation is a market condition in which prices for near term delivery are higher that those for delivery in further forward months. The opposite condition is referred to as Contango in which prices for forward delivery dates are higher than those for nearer delivery dates.) Since the Brent cargo traded July 10 was relatively prompt (i.e., the specified loading date was at the beginning of the July 20-31 assessment period), the overall value of Dated Brent covering the full assessment window could be expected to be lower than the August minus 2 cts achieved.
2. In the case of Oseberg, where the actual trade fell at the back end of the assessed date range window, it was estimated that a prompt cargo would be transactable at around Dated Brent plus 10 cts. The overall Oseberg assessment, therefore, was set at a midpoint of Dated Brent plus 7.5 cts, which is the mid-point of the observed "plus 5 cts" and the estimated prompt value.
3. In the case of the Forties bid, the cargo loading July 24-26 was fairly close to the middle of the loading range, and fell roughly in line with recent market activity. This cargo was thus deemed representative of value and Forties was assessed for the entire window at a mid-point of Dated Brent plus 7.5 cts.

Thus, the normalized cargo assessments for the entire window on a relative basis are:

1. Dated Brent=less than August cash Brent–2 cts
2. Dated Forties=Dated Brent plus 7.5 cts
3. Dated Oseberg=Dated Brent plus 7.5 cts.

Fixed Price Conversion

The next step was to establish a fixed price range for every cargo assessment. Since the Brent cargo traded was done on the basis of an August Brent price, the process was to determine the August Brent price and subtract the 2 cts/bbl. Market analysis indicated that August Brent was trading at around 33 cts/bbl over September Brent at a time that September Brent was trading at $25.62/bbl. Hence, the Dated Brent cargo traded on a fixed price equivalent of September Brent (=$25.62), plus a spread of $0.33/bbl (=$25.95), minus $0.02 discount for the physical Brent. This equates to a fixed price of $25.93/bbl.

For Dated Oseberg, the value was established at Dated Brent plus 7.5 cts. Cargoes done on a quote-related basis are often referred as transactions on a floating basis. Floating transactions price most commonly on a bill-of-lading basis. In order to obtain a fixed price equivalent it is therefore important to know market valuations prevailing for the time of loading. Typically, the market establishes a secondary/derivative market that enables hedgers and speculators to determine the value of forward trades. Hence, in order to determine the fixed price equivalent of the Dated Oseberg at Dated Brent plus 7.5 cts, a value for the underlying Dated Brent swap needed to be determined. The same process needed to be applied to the Dated Forties.

On Jul. 10, 2002, the Dated Brent swap market had the following transactable values:

| | |
|---|---|
| Week of July 15-19: | $25.75 |
| Week of July 22-26: | $25.68 |
| Week of July 29-Aug 2: | $25.65 |

A Dated Brent swap covering the assessed period July $20^{th}$ to July $31^{st}$ has a value of $25.68, based on a linear interpolation using defined data points. Therefore a cargo loading during the assessed period of July $20^{th}$ to July $31^{st}$ and pricing at Dated Brent plus 7.5 cts has a fixed price of 25.755 cts.

Normalized cargo assessments on a fixed price basis for July $20^{th}$-July $31^{st}$
1. Dated Brent: less than 25.93
2. Dated Oseberg: 25.755
3. Dated Forties: 25.755

The Dated Brent assessment published effective Jul. 10, 2002, was therefore shown as $25.73-25.78, with a mid-point of $25.755. The actual spread that is defined around the mid-point is based on a subjective determination of the likely spread that would define a credible (i.e., realistic) range of offers and bids. The assessment was determined by the values for both Oseberg and Forties, both of which proved more competitive than physical Brent itself on the day.

As with the Brent blend on which the Brent benchmark is based, production output of Dubai blend, on which the Dubai benchmark is based, in the Persian Gulf has steadily declined over recent years to a point where the number of monthly cargoes of Dubai blend are so few that a trader could quite conceivably buy all the Dubai cargoes to squeeze the Dubai benchmark assessment. Also as with the Brent benchmark assessment, the solution developed for the Dubai scenario is to artificially increase the amount of market activity involving Dubai, that is create an effective volume of tradable Dubai that is greater than the actual, physical volume of tradable Dubai. The mechanism by which this larger effective volume is created for Dubai, however, is different than the mechanism employed to create the larger effective volume of Brent. To create the larger effective volume of Dubai for the purpose of deriving the Dubai benchmark assessment, in any sale involving Dubai blend, the seller has the option, entirely at the seller's option, to provide a delivery of Oman crude oil, another Persian Gulf blend that is similar to Dubai in quality and price. A buyer would not be incented to try to buy up all of the available Dubai blend. As a practical matter, the buyer cannot buy up all the effective volume of Dubai because the buyer may be getting, Oman blend instead of Dubai. The buyer does not know if it will be getting Dubai blend or Oman blend until such time as the seller specifies the blend that will be delivered in satisfaction of the contract for sale of the Dubai blend. In accordance with the preferred implementation of the present invention, the seller must, however, specify if an alternative grade will be delivered immediately upon conclusion of the transaction and most preferable within the same communication (e.g. a telephone call or exchange of e-mails) in which the transaction is completed. If the seller does not immediately specify if an alternative grade, that unexercised option to deliver an alternative grade itself introduces a new option value into the marketplace that can further complicate and destabilize assessments.

Thus, the Dubai benchmark assessment is preferably based only on market activity directly involving Dubai blend; the assessment will not include market activity involving Oman, or some other Persian Gulf blend. The fundamentals of the Dubai market activity will, however, reflect the fact that sales involving Dubai blend may involve deliveries of Oman blend. The additional volume of crude oil that is artificially injected into the Dubai market will help to moderate the volatile swings in the price of Dubai.

While the invention has been described in connection with what are presently considered to be the most practical and preferred embodiments, it is to be understood that the invention is not to be limited to the disclosed embodiments, but, on the contrary, is intended to cover various modifications and equivalent arrangements, as well as applications to commodities other than crude oil and to crude oils other than Brent and Dubai, included within the spirit and scope of the appended claims.

What is claimed is:

1. A method of determining a benchmark price for a commodity, wherein the benchmark price corresponds to a benchmark grade of the commodity, said method comprising:
creating an effective tradable volume of the benchmark grade that is greater than an actual, physical volume of the benchmark grade to provide a number of effective market events involving the effective tradable volume of the benchmark grade that is greater than a number of actual market events involving actual, physical volumes of the benchmark grade; and
assessing the benchmark price based on the effective market events involving the effective tradable volume of the benchmark grade.

2. The method of claim 1, wherein said assessing is based on market events involving at least two of two or more grades of the commodity including the benchmark grade.

3. The method of claim 1, wherein creating the effective volume of the benchmark grade comprises observing prices stated in one or more market events involving actual, physical volumes of the benchmark grade of the commodity and observing prices stated in one or more market events involving each of one or more alternative grades of the commodity, and wherein assessing the benchmark price comprises deriving the benchmark price from the most competitive of the prices observed in the one or more market events involving the actual, physical volumes benchmark grade and the prices observed in the one or more market events involving each of the one or more alternative grades.

4. The method of claim 1, wherein creating the effective volume of the benchmark grade comprises observing prices in market events involving the benchmark grade, wherein each market event involving the benchmark grade comprises delivery of an actual, physical volume of the benchmark grade or a volume of an alternative grade of the commodity.

5. The method of claim 3, wherein creating the effective volume of the benchmark grade further comprises observing prices in market events involving the benchmark grade, wherein each market event involving the benchmark grade comprises delivery of an actual, physical volume of the benchmark grade or a volume of an alternative grade of the commodity.

6. The method of claim 1, wherein the commodity is crude oil.

7. The method of claim 6, wherein the benchmark grade comprises Brent blend crude oil.

8. The method of claim 6, wherein the benchmark grade comprises Dubai crude oil.

9. The method of claim 3, wherein:
the commodity is crude oil;
the benchmark grade comprises Brent blend crude oil; and
the alternative grades comprises one or more grades selected from Oseberg and Forties crude oils.

10. The method of claim 4, wherein:
the commodity is crude oil;
the benchmark grade comprises Dubai crude oil; and
the alternative grade comprises Oman crude oil.

11. A method of determining a benchmark price for a commodity, wherein the benchmark price corresponds to a benchmark grade of the commodity, said method comprising:
assessing the benchmark price based on market events involving at least two of two or more grades of the commodity including the benchmark grade; and
increasing the number of market events upon which the assessed benchmark price is based by including in the market events upon which the assessed benchmark price is based transactions involving the benchmark grade of the commodity as well as transactions involving at least one alternative grade of the commodity.

12. The method of claim 11, wherein the transactions involving at least one alternative grade of the commodity comprise sales of one or more specified alternative grades of the commodity.

13. The method of claim 12, wherein the transactions involving at least one alternative grade of the commodity further comprise offers for sale of one or more specified alternative grades of the commodity.

14. The method of claim 11, wherein the transactions involving at least one alternative grade of the commodity comprise deliveries of a specified alternative grade of the commodity in satisfaction of a contract for sale of the benchmark grade of the commodity.

15. The method of claim 12, wherein the transactions involving at least one alternative grade of the commodity further comprise deliveries of a specified alternative grade of the commodity in satisfaction of a contract for sale of the benchmark grade of the commodity.

16. The method of claim 11, wherein the commodity is crude oil.

17. The method of claim 16, wherein the benchmark grade comprises Brent blend crude oil.

18. The method of claim 16, wherein the benchmark grade comprises Dubai crude oil.

19. The method of claim 12, wherein:
the commodity is crude oil;
the benchmark grade comprises Brent blend crude oil; and
the alternative grades comprises one or more grades selected from Oseberg and Forties crude oils.

20. The method of claim 14, wherein:
the commodity is crude oil;
the benchmark grade comprises Dubai crude oil; and
the alternative grade comprises Oman crude oil.

* * * * *

UNITED STATES PATENT AND TRADEMARK OFFICE
CERTIFICATE OF CORRECTION

| | |
|---|---|
| PATENT NO. | : 8,271,374 B2 |
| APPLICATION NO. | : 10/206831 |
| DATED | : September 18, 2012 |
| INVENTOR(S) | : Montepeque |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3117 days.

Signed and Sealed this
Twentieth Day of August, 2013

Teresa Stanek Rea
*Acting Director of the United States Patent and Trademark Office*